US012000171B2

United States Patent
Olivieri et al.

(10) Patent No.: US 12,000,171 B2
(45) Date of Patent: Jun. 4, 2024

(54) MOUNTING SYSTEM FOR MOUNTING AN ELECTRONIC DEVICE ON A VEHICLE

(71) Applicant: Deere & Company, Moline, IL (US)

(72) Inventors: Pablo G. Olivieri, Long Beach, CA (US); Stephen Piltingsrud, Fargo, ND (US); Michael A. Hajicek, West Fargo, ND (US)

(73) Assignee: Deere & Company, Moline, IL (US)

( * ) Notice: Subject to any disclaimer, the term of this patent is extended or adjusted under 35 U.S.C. 154(b) by 1112 days.

(21) Appl. No.: 16/599,906

(22) Filed: Oct. 11, 2019

(65) Prior Publication Data

US 2020/0291674 A1  Sep. 17, 2020

Related U.S. Application Data

(60) Provisional application No. 62/819,066, filed on Mar. 15, 2019.

(51) Int. Cl.
  *E05B 57/00* (2006.01)
  *E05B 5/00* (2006.01)
  *E05B 13/00* (2006.01)

(52) U.S. Cl.
  CPC ............ *E05B 13/001* (2013.01); *E05B 5/006* (2013.01); *E05B 57/00* (2013.01)

(58) Field of Classification Search
  CPC ........ E05B 13/001; E05B 5/006; E05B 57/00; E05B 65/0089; Y10T 70/7915; Y10T 70/5562; Y10T 70/558; B60K 15/0409; B60B 7/16
  USPC .......................................... 70/416, 164, 167
  See application file for complete search history.

(56) References Cited

U.S. PATENT DOCUMENTS

| | | | | |
|---|---|---|---|---|
| 3,812,279 A | * | 5/1974 | Voegeli | H02G 3/14 70/172 |
| 3,888,096 A | * | 6/1975 | Huss | E05B 13/001 70/416 |
| 4,473,251 A | * | 9/1984 | Murayama | B62J 17/10 381/86 |
| 4,584,856 A | * | 4/1986 | Petersdorff | H01R 13/6397 70/DIG. 72 |
| 4,630,160 A | * | 12/1986 | Murayama | B62K 19/48 455/90.3 |

(Continued)

FOREIGN PATENT DOCUMENTS

| | | |
|---|---|---|
| DE | 10203077 A1 | 8/2003 |
| DE | 102016101973 A1 | 8/2016 |

(Continued)

OTHER PUBLICATIONS

German Search Report issued in application No. DE202020101410.2 dated Nov. 15, 2022 (03 pages).

*Primary Examiner* — Suzanne L Barrett

(57) ABSTRACT

A handle is arranged for controlling the latch to engage or disengage the keeper. The handle is positioned in a recess of the removable electronic device. A panel or cover covers the handle. The cover has one or more retainers associated with a first end. An opening is associated with a second end opposite the first end. A rotatable lock is secured in the opening, where in a locked state the rotatable lock has a lock latch that engages a lock recess or lock keep in the recess to secure the panel to prevent access to the handle.

11 Claims, 12 Drawing Sheets

(56) References Cited

U.S. PATENT DOCUMENTS

| | | | | |
|---|---|---|---|---|
| 4,655,057 | A * | 4/1987 | Derman | G11B 23/049 360/137 |
| 4,913,254 | A * | 4/1990 | Castro | B60R 25/002 70/174 |
| 5,201,202 | A * | 4/1993 | Kam | E05B 13/001 70/168 |
| 5,303,971 | A * | 4/1994 | Johnsen | E05B 13/001 70/168 |
| 5,531,045 | A * | 7/1996 | Piltingsrud | E05F 11/34 49/345 |
| 5,735,147 | A * | 4/1998 | Cattanach | B60R 25/08 70/164 |
| 5,737,948 | A * | 4/1998 | Lefkovits | E05B 17/142 70/164 |
| 5,826,922 | A * | 10/1998 | Wernig | E05C 9/041 292/172 |
| 5,970,756 | A * | 10/1999 | Miller | E05B 17/2084 70/168 |
| 6,918,521 | B2 * | 7/2005 | Settelmayer | B60R 9/055 224/319 |
| 7,174,754 | B2 * | 2/2007 | Gahlhoff, Jr. | E05B 35/007 70/168 |
| 8,348,112 | B2 * | 1/2013 | Becker | H01Q 1/1221 224/547 |
| 8,662,364 | B2 * | 3/2014 | Vuillet | B60R 11/0264 224/276 |
| 8,881,561 | B2 * | 11/2014 | Niehausmeier | E05B 13/001 70/91 |
| 9,487,156 | B2 * | 11/2016 | Frenzel | B60R 11/02 |
| D867,176 | S | 11/2019 | Olivieri | |
| D909,895 | S * | 2/2021 | Olivieri | D10/65 |
| 2004/0040119 | A1* | 3/2004 | Robinson | E05B 35/008 16/422 |
| 2005/0146860 | A1* | 7/2005 | Chen | H04M 1/0283 361/815 |
| 2010/0025561 | A1 | 2/2010 | Becker | |
| 2013/0180298 | A1* | 7/2013 | Miller | E05B 63/06 70/332 |
| 2014/0165668 | A1* | 6/2014 | Niehausmeier | E05B 13/001 70/101 |

FOREIGN PATENT DOCUMENTS

| | | | |
|---|---|---|---|
| JP | H08156709 A | 6/1996 | |
| JP | 2001260968 A * | 9/2001 | B62H 5/00 |

* cited by examiner

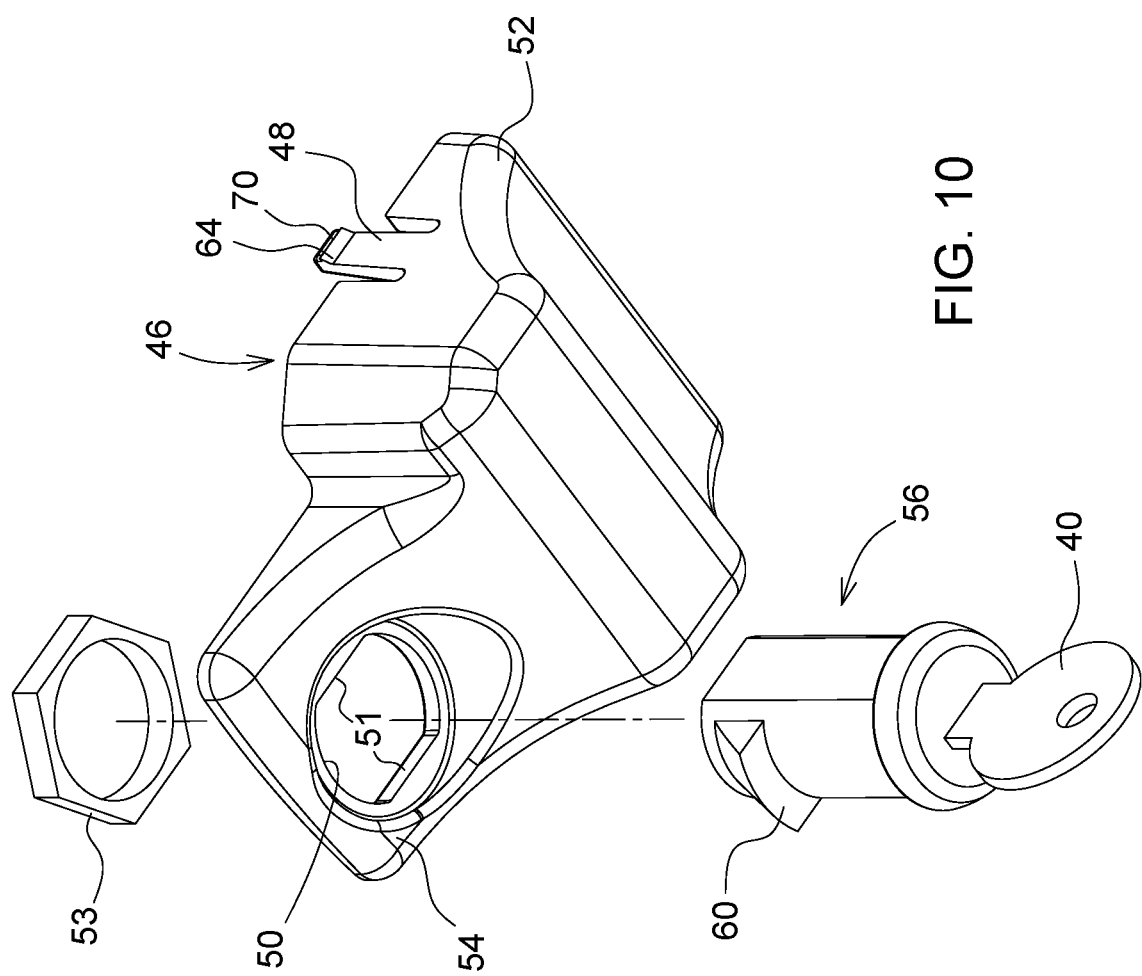

MOUNTING SYSTEM FOR MOUNTING AN ELECTRONIC DEVICE ON A VEHICLE

RELATED APPLICATION

This application claims the benefit of the filing date of and priority to U.S. Provisional Application Ser. No. 62/819,066, filed Mar. 15, 2019, which is incorporated herein by reference in its entirety.

FIELD

This disclosure relates to a mounting system for mounting a removable electronic device on a vehicle.

BACKGROUND

Location-determining receivers, sensors and other removable electronic devices are commonly mounted on agricultural vehicles to provide position data, attitude data and/or motion data to a variety of precision agriculture applications. For example, a removable electronic device may comprise a location-determining receiver, such as a global navigation satellite system (GNSS) receiver or global positioning system (GPS) receiver. Under certain prior art, the removable electronic device can be disconnected or removed from the vehicle by operation of a latch without security measures or theft deterrence. For instance, the latch without security measures may allow the owner of the vehicle or any unauthorized third party (e.g., an interloper or thief) to remove the electronic device from the vehicle. Accordingly, there is a need for an improved mounting system for mounting a removable electronic device on a vehicle with greater security to prevent or discourage theft or unwanted removal of the removable electronic device.

SUMMARY

In accordance with one embodiment, a mounting system comprises a mounting bracket attachable to a vehicle. The mounting bracket has an engaging member and a keeper. A retainer is attached to a removable electronic device. The retainer is capable of engaging and rotating around said engaging member. A latch is connected to the removable electronic device. The latch comprises a rotor capable of engaging the keeper and securing the removable electronic device to the mounting bracket after the retainer has engaged the engaging member. A handle (e.g., lever) is arranged for controlling the latch to engage or disengage the keeper. A panel or cover can cover the handle. The cover has one or more retainers (e.g., interlocking retainers) associated with a first end that connect the cover to the housing at or near the first end. An opening is associated with a second end opposite the first end. A rotatable lock is secured in the opening, where in a locked state the rotatable lock has a lock latch that engages a lock recess in the lock recess or lock keep to secure the panel to prevent or discourage access (e.g., unauthorized access) to the handle.

BRIEF DESCRIPTION OF THE DRAWINGS

FIG. 10 is an exploded bottom perspective view of the cover and the lock assembly of FIG. 1.

Like reference numbers in any set of drawings indicates like elements or like features.

DETAILED DESCRIPTION

Figure 1:
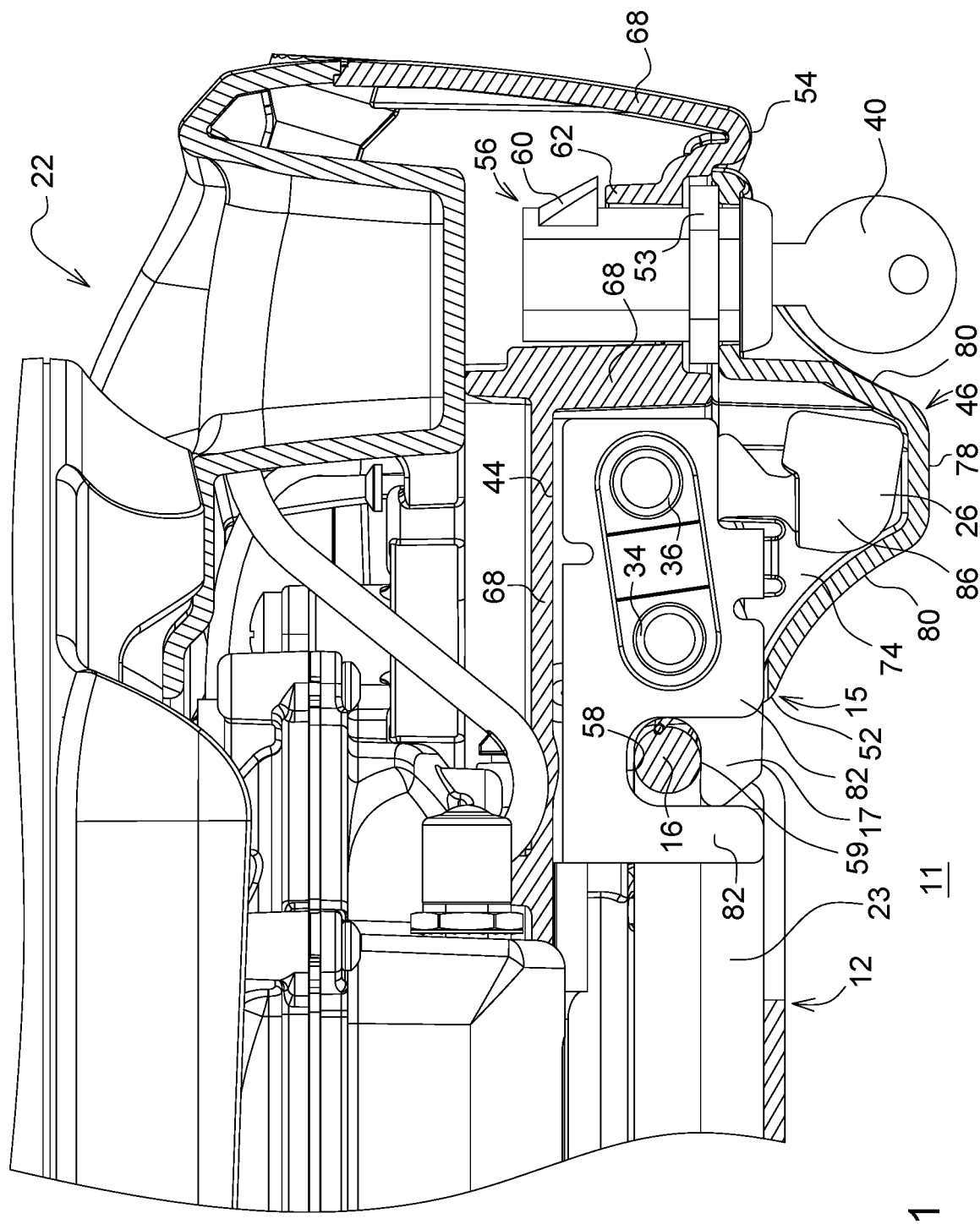
FIG. 1 is cross-section of one embodiment of the mounting system for securing a removable electronic device, as viewed along reference line 1-1 in FIG. 6, where the mounting bracket is shown attached to the removable electronic device.
Figure 2:
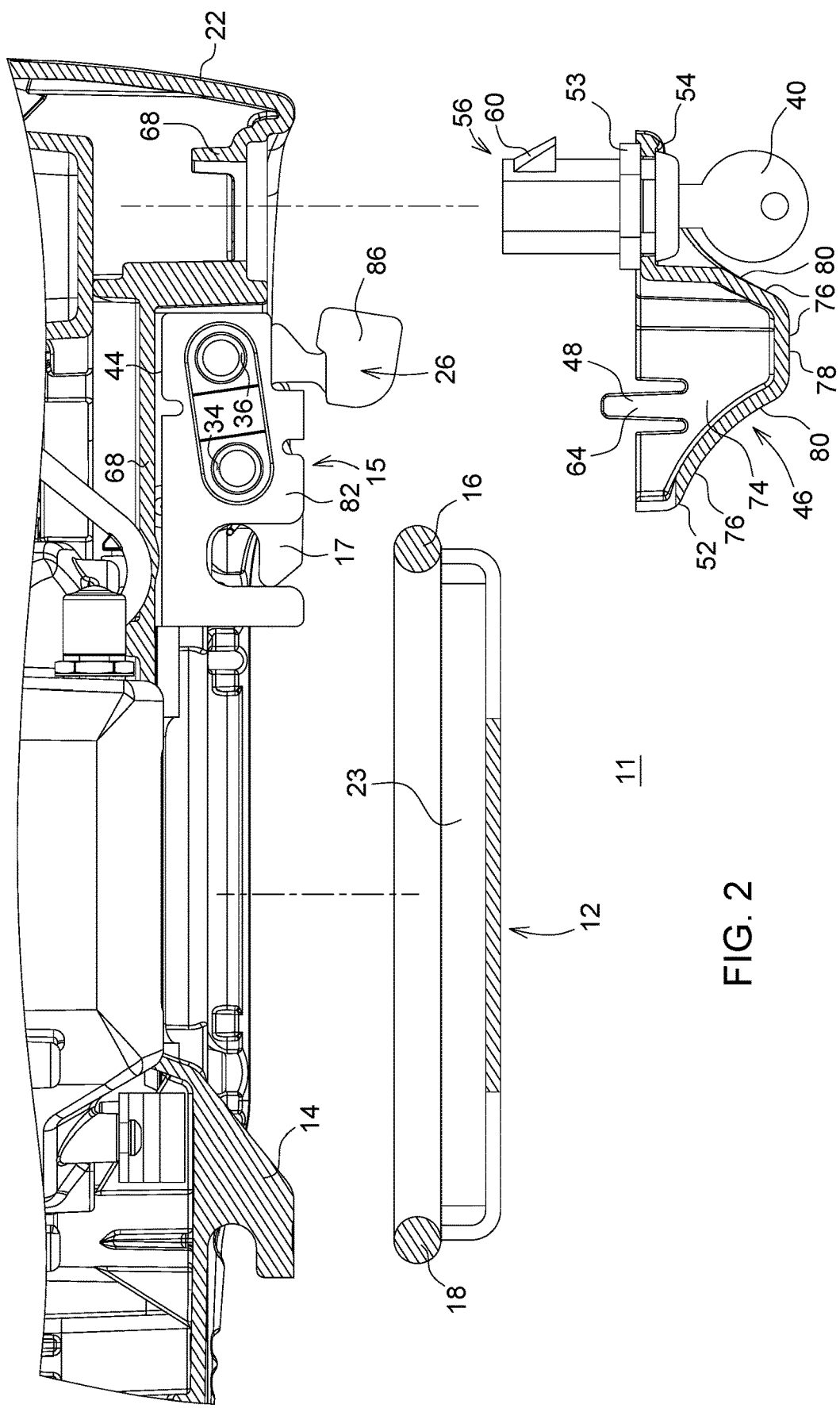
FIG. 2 is an exploded cross-section of the mounting system of FIG. 1.
Figure 3:
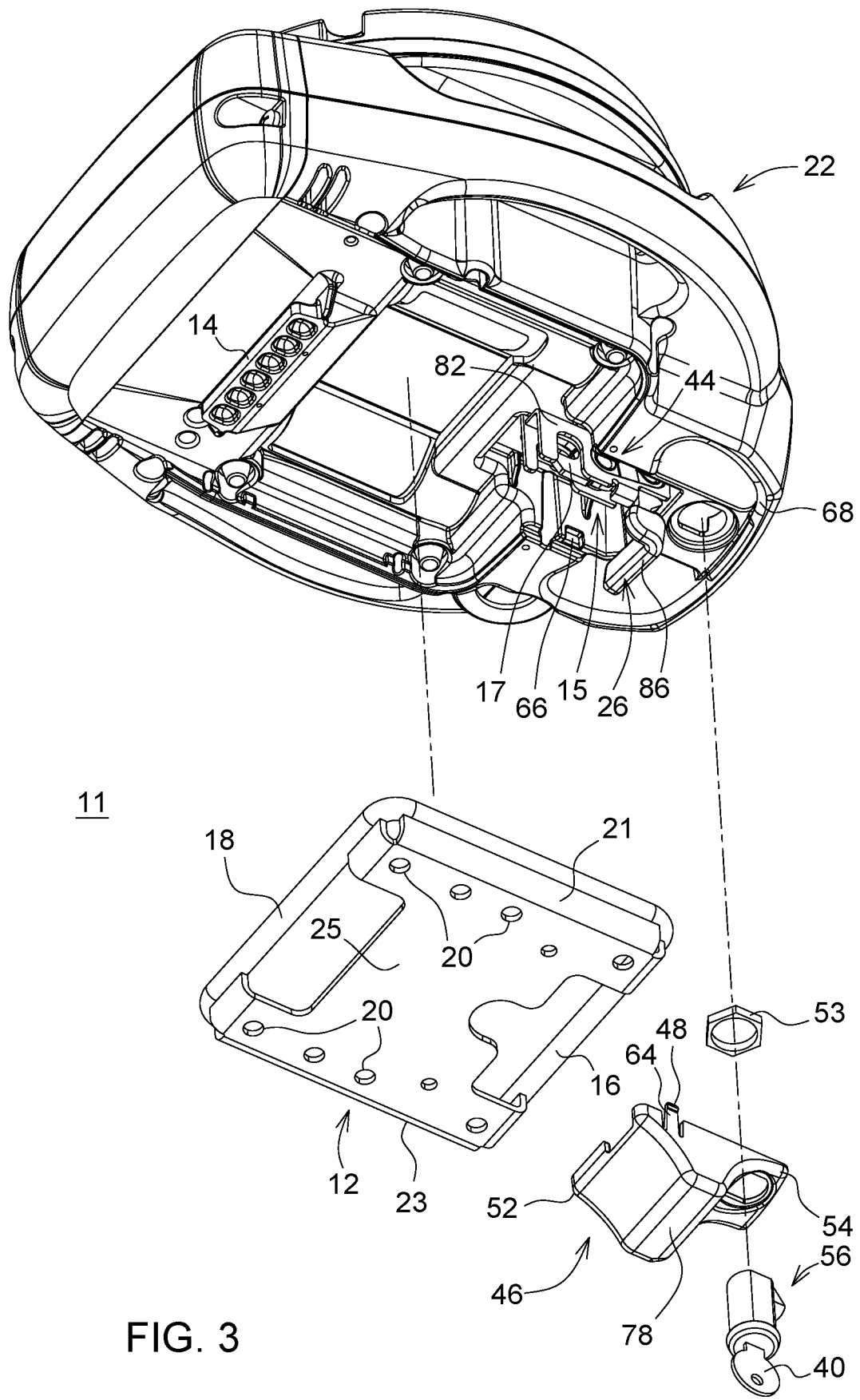
FIG. 3 is an exploded perspective view the mounting system, of FIG. 1, for securing the electronic device, as viewed from below.
Figure 4:
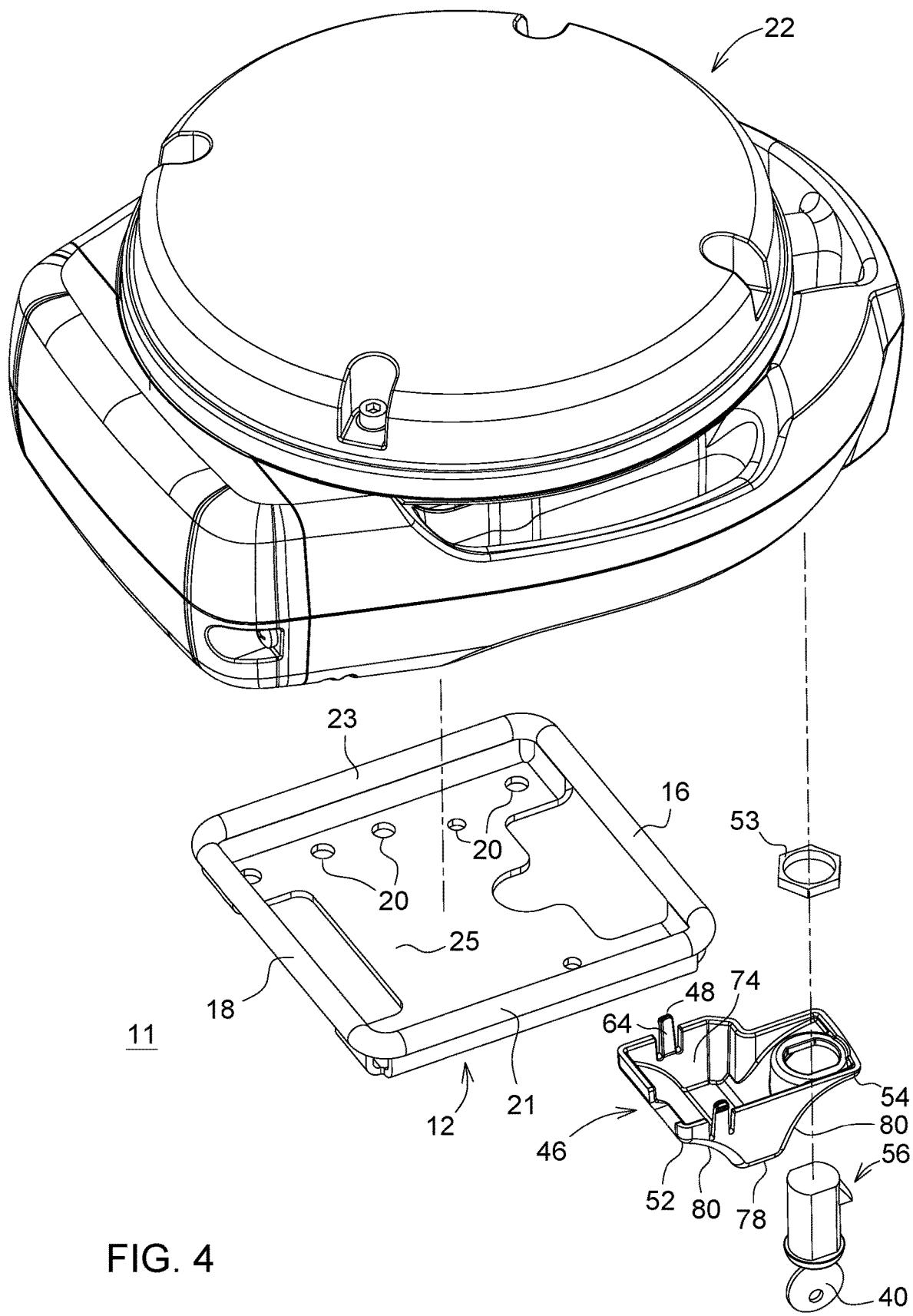
FIG. 4 is an exploded perspective view of the mounting system, of FIG. 1, for securing the electronic device, as viewed from above.
Figure 5:
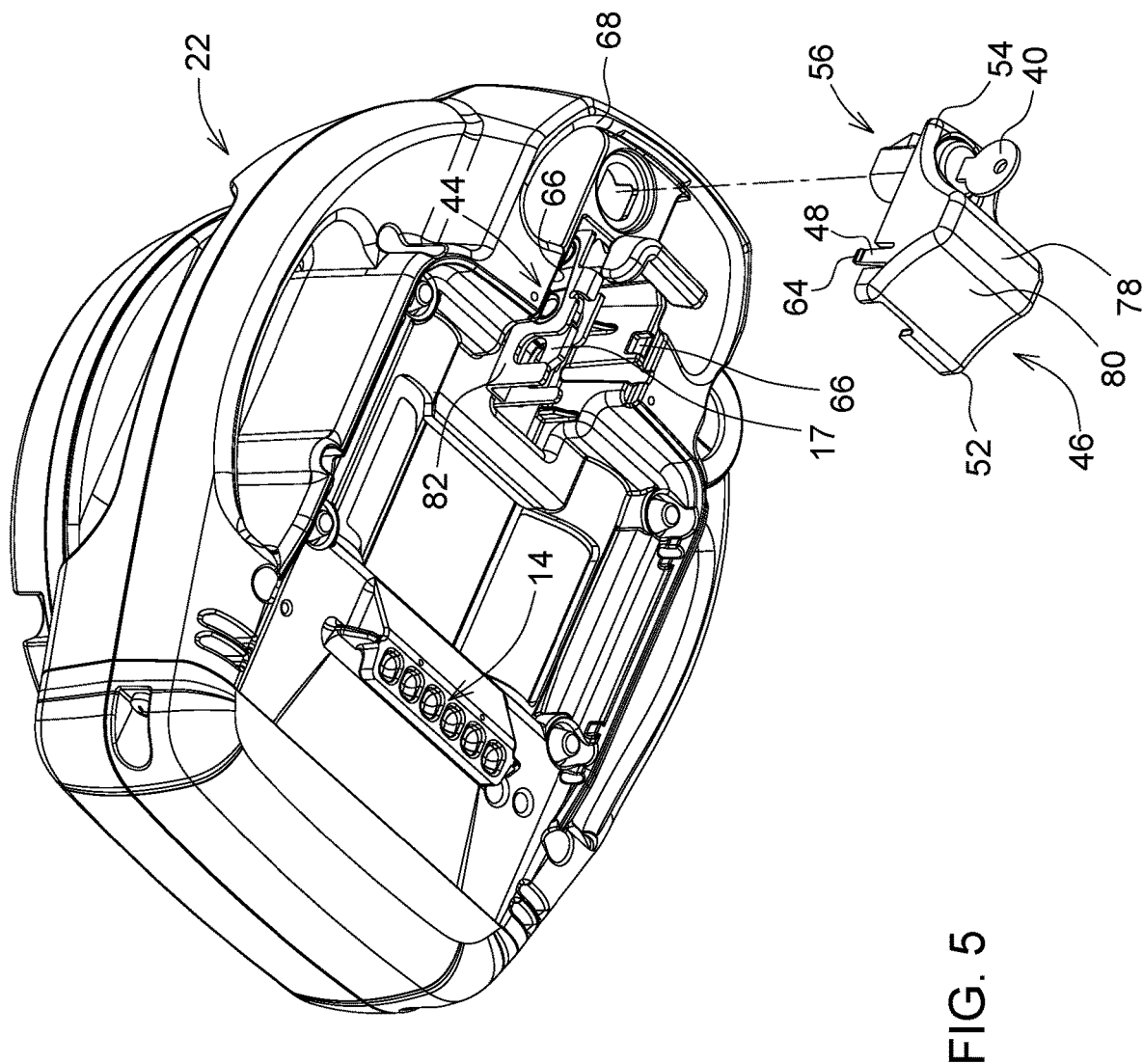
FIG. 5 is an exploded perspective view of the cover and lock assembly that is removed from the housing of the electronic device of FIG. 1.
Figure 6:
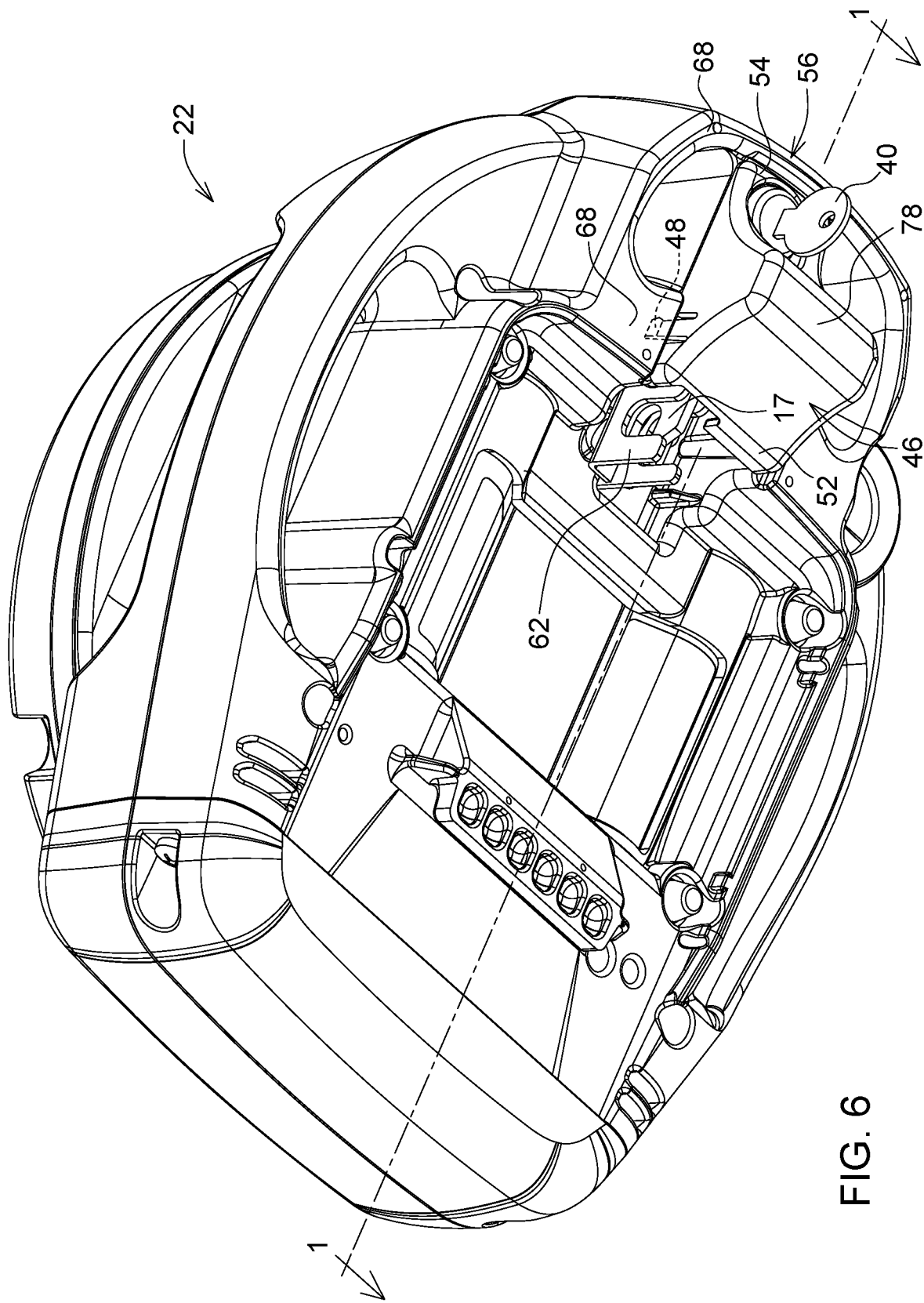
FIG. 6 is a perspective view of the cover and lock assembly installed or secured to the housing of the electronic device of FIG. 1.
Figure 7:
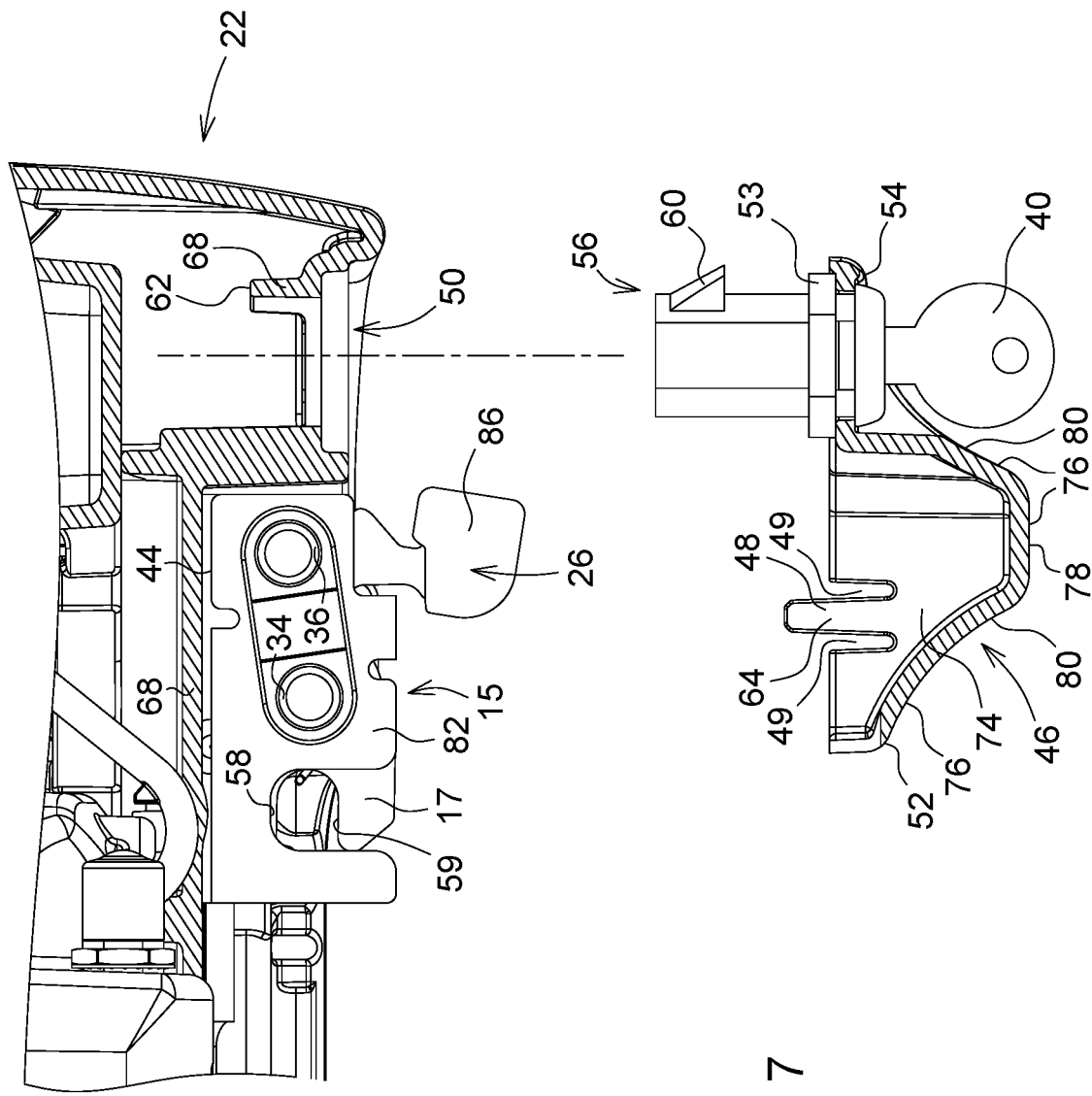
FIG. 7 is an exploded cross-section of the cover and lock assembly that is secured to the housing of the electronic device of FIG. 1, such as where the lock assembly is in a locked state.
Figure 8A:
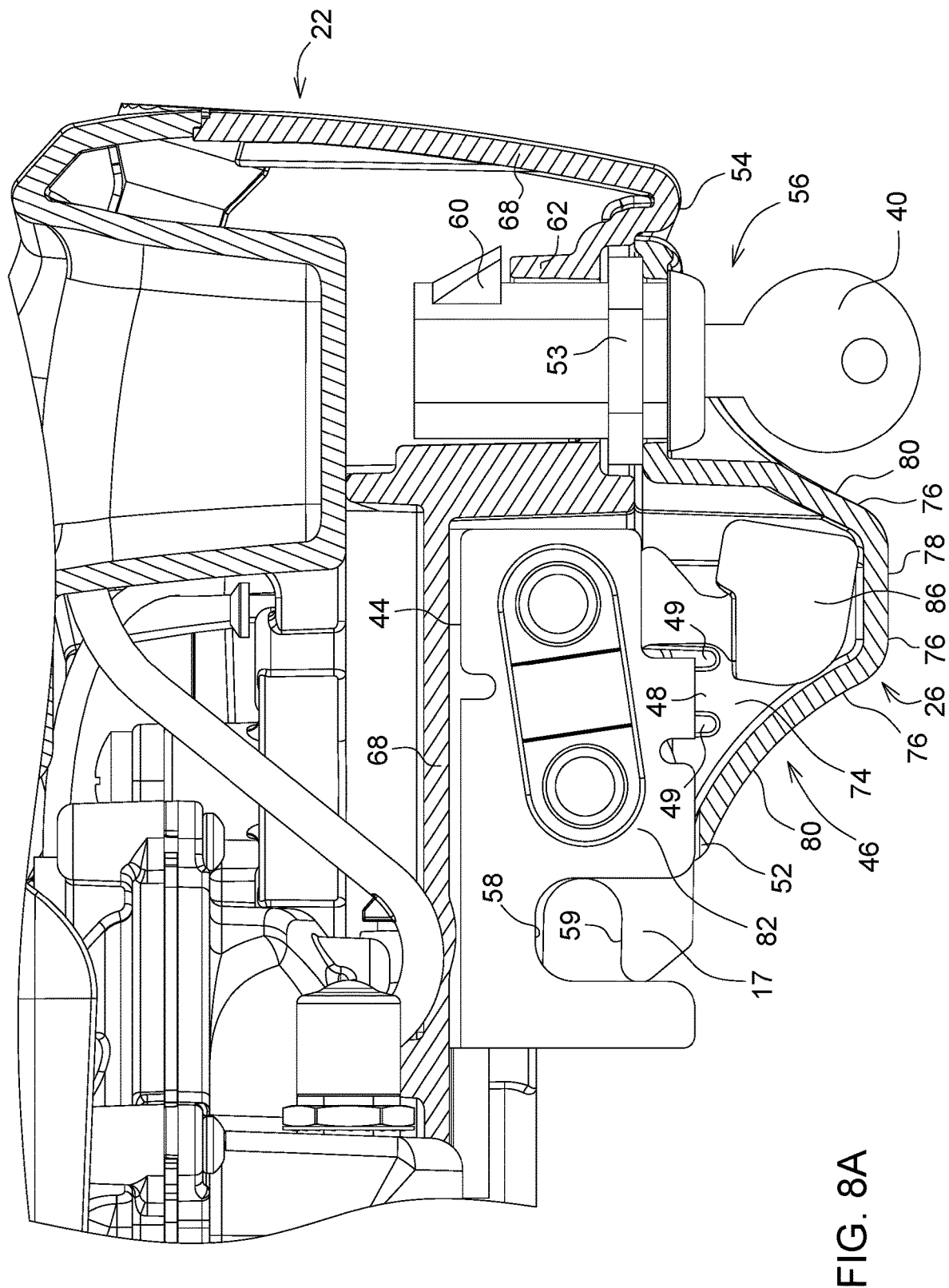
FIG. 8A is one embodiment of an enlarged cross-sectional view of the mounting system of FIG. 1 that shows the handle within an enclosed volume of the cover.
Figure 8B:
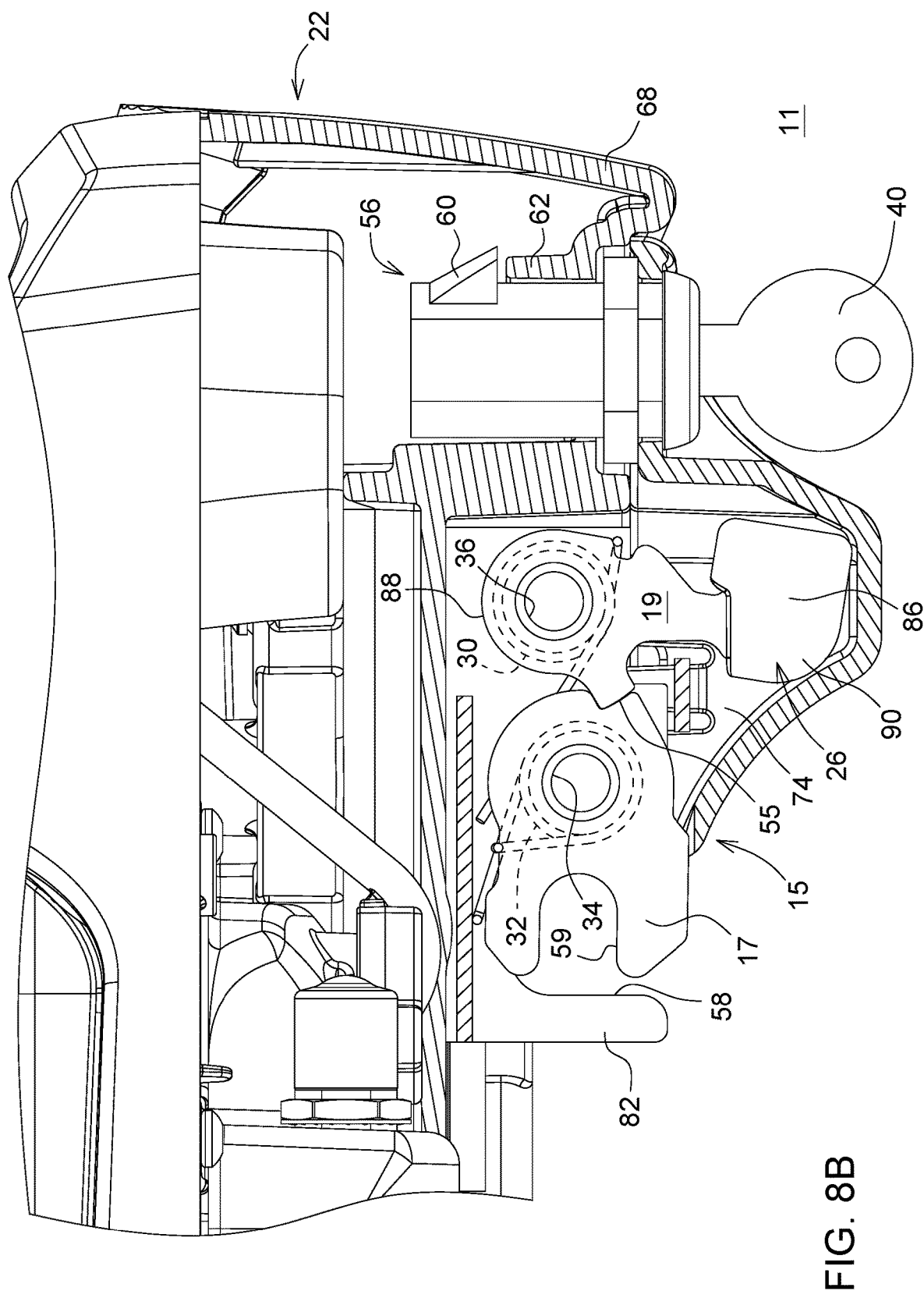
FIG. 8B shows a similar view to FIG. 8A except the frame is cutaway to reveal an interior of the latch assembly.
Figure 8C:
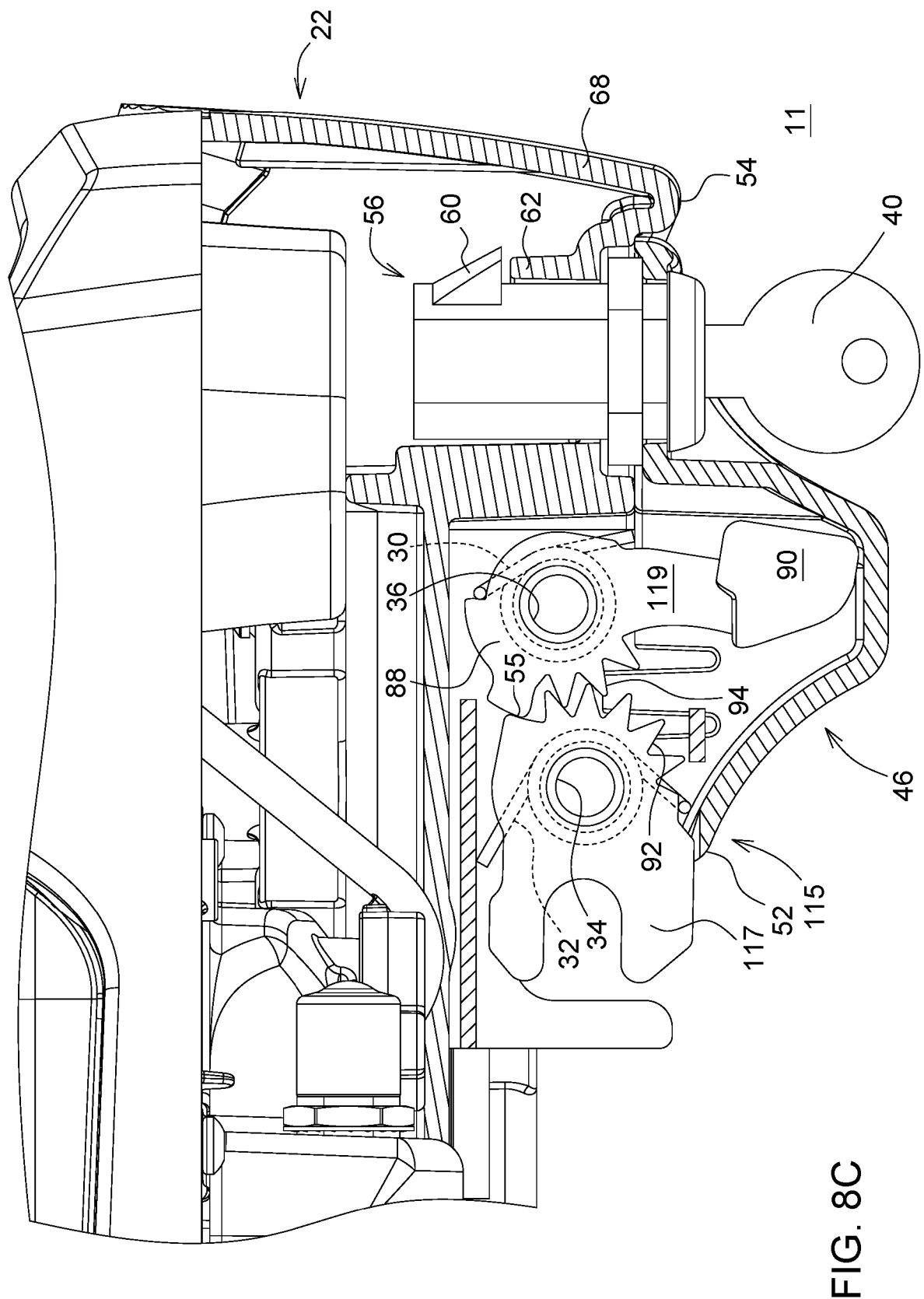
FIG. 8C shows an alternate embodiment of the FIG. 8B with respect to the interior of the latch assembly.
Figure 9:
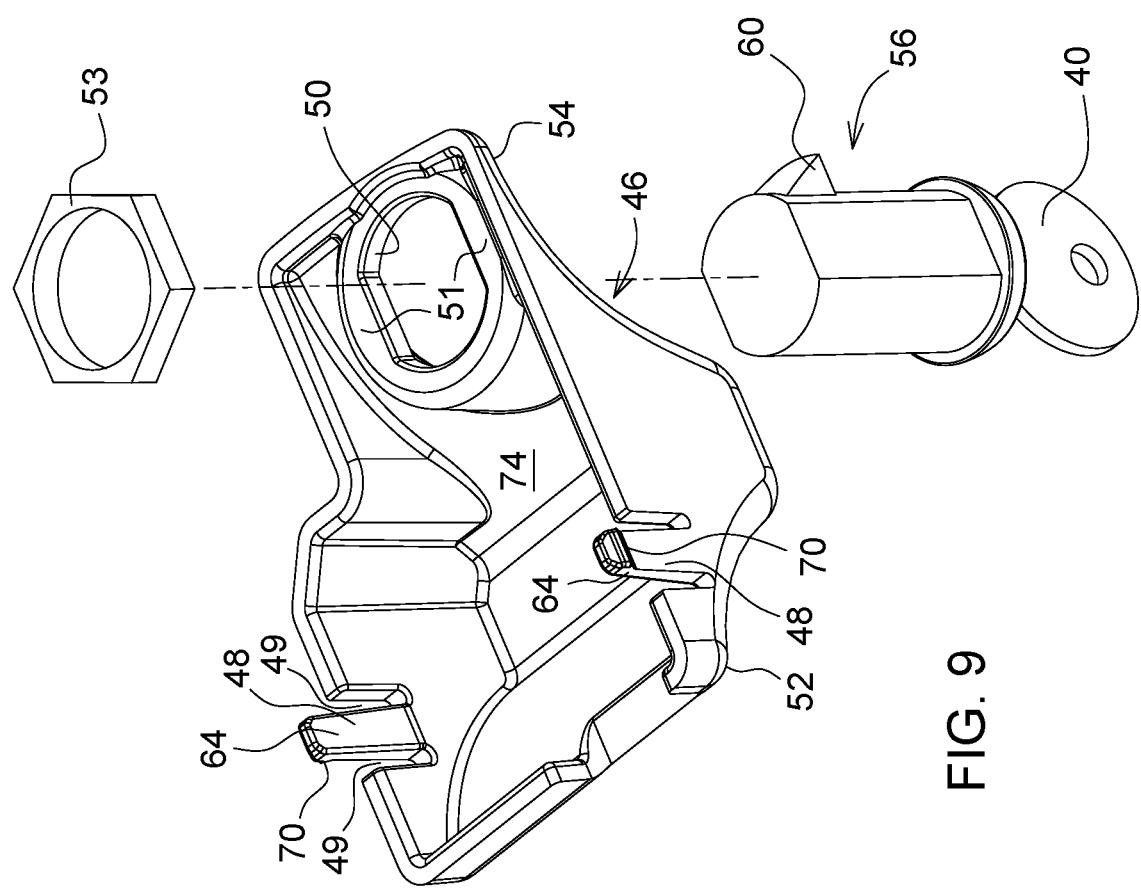
FIG. 9 is an exploded top perspective view of the cover and the lock assembly of FIG. 1.

In accordance with one embodiment as illustrated in FIG. 1 through FIG. 8B, inclusive, FIG. 9 and FIG. 10, a mounting system 11 comprises a mounting bracket 12 that is attachable to a vehicle, such as a roof of a vehicle. The mounting bracket 12 has an engaging member 18 and a keeper 16. A retainer 14 is attached to a removable electronic device. The retainer 14 is capable of engaging and rotating (at least partially) around the engaging member 18. A latch 15 is connected to the removable electronic device. The latch 15 comprises a rotor 17 capable of engaging the keeper 16 and securing the removable electronic device to the mounting bracket 12 if the retainer 14 has engaged the engaging member 18. A handle 26 (e.g., lever) is arranged for controlling the latch 15 (or a rotor 17 of the latch 15) to engage or disengage the keeper 16. A user can operate the handle 26 to engage (e.g., attach) the removable electronic device 22 to the mounting bracket 12 by the controllable latch 15 engaging the keeper 16. Conversely, if the cover 46 is not closed and locked to the housing of the removable electronic device 22, a user can operate the handle 26 to engage (e.g., detach) the removable electronic device 22 to the mounting bracket 12 by the controllable latch engaging the keeper 16.

In one embodiment, the handle 26 is positioned downward from the latch 15 of the removable electronic device 22.

In an alternate embodiment, the handle is positioned in a recess 44 (e.g., indentation) of the removable electronic device 22, or in a recess 44 in which the latch 15 resides.

In one embodiment, a panel or cover 46 can cover the handle 26 (e.g., and a recess 44 about the handle 26 or in which the handle 26 can reside when the removable electronic device 22 is attached to the mounting bracket 12). The cover 46 has one or more retainers 48 associated with a first end 52, where the retainers 48 may interlock or mate with respective recesses in the housing. In one configuration, the cover 46 terminates in one or more retainers 48 associated with the first end 52, such that the retainers 48 are substantially hidden from view when the cover 46 is installed on the housing in a closed state or locked state.

In one embodiment, an opening 50 is associated with a second end 54 opposite the first end 52 of the cover 46. For example, the opening 50 is generally oblong, oval or semi-circular with one or two rectilinear sides 51 (e.g., flats) to prevent rotation of the outer body of the rotatable lock 56, while allowing its inner cylinder to rotate; hence, lock or unlock the rotatable lock 56 by insertion and application of torque to a key 40. A rotatable lock 56 is secured in the opening 50 by a fastener 53, where in a locked state the rotatable lock 56 has a lock latch 60 that engages a lock recess 62 or other lock keep in the housing (e.g., around the recess 44 in which the latch is mounted) to secure the cover 46 panel to prevent or discourage access to the handle 26. For example, the fastener 53 may comprise a nut that engages threads on the shaft or rounded portion of the shaft of the rotatable lock 56 or a retention ring that engages a slot or step in the shaft of the rotatable lock 56. Hence, if unauthorized users are prevented or discouraged from access to the handle 26 to release the latch 15 from engaging the keeper 16, the removable electronic device 22 can remain attached or connected to its mounting bracket 12 via the latch 15 engaging keeper 16, at least until the authorized user unlocks the rotatable lock 56 (e.g., by inserting and rotating key 40) and removes the cover 46 from the housing (e.g., housing interface, seating interface or rim that the cover 46 adjoins, contacts or mates with) of the removable electronic device 22.

In one embodiment, the retainers 48 comprise snap-fit arms 64 that engage corresponding snap-fit recesses 66 in a housing 68 of the electronic device near or about the housing 68 recess 44. The snap-fit arms 64 or retainers 48 may be separated from a wall of the cover by openings or slits 49 (e.g., to support bending or elastic deformation of the snap-fit arms 64 for engagement or disengagement of the corresponding snap-fit recesses 66. Further, when the snap-fit arms 64 of the cover 46 engage corresponding snap-fit recesses 66 of the housing or when the snap-fit arms 64 and corresponding snap-fit recesses 66 are in a locked state or interlocking state, the snap-fit arms 64 and corresponding snap-fit recesses 66 are substantially hidden (e.g., except at possible seam between the cover 46 and housing) from a user's view by the cover 46 and housing. In one configuration, each of the snap-fit arms 64 terminate in a snap-fit protrusion 70. In the locked state, the rotatable lock 56 binds, secures or locks the snap-fit protrusion 70 in a static or fixed position with respect to its corresponding snap-fit recess 44, where the snap-fit protrusion 70, the snap-fit recess 44, or both may be configured with some elastic deformation to support attachment and/or detachment (e.g., removal) of the cover 46 to or from the housing of the removable electronic device 22.

In one configuration, the one or more retainers 48 comprise snap-fit arms 64 that engage corresponding snap-fit recesses 66 in the housing 68 of the electronic device, wherein the rotatable lock 56 simultaneously secures the first end 52 and the second end 54 to the housing 68 to prevent movement between the housing 68 and the cover 46.

The cover 46 has a storage volume 74 or a pocket for storing the handle. As illustrated, the storage volume 74 has a generally polygonal cross section 76 that tapers downward and inward toward a bottom 78 of the storage volume 74. Further, downward tapering walls 80 of the storage volume 74 are substantially curved or arced.

In alternate embodiments, the cover 46 or storage volume 74 in the cover 46 may have other geometric shapes.

As illustrated in FIG. 8A in a locked state, the rotatable lock 56 has a lock latch 60 that engages a lock recess 62 or other lock keep in the recess 44 to secure the cover 46 (e.g., panel) to prevent access to the handle 26; hence, prevent an unauthorized person from releasing the latch 15, or its rotor 17, to remove the removable electronic device 22 from the mounting bracket 12, or the vehicle on which the mounting bracket 12 is attached. Conversely, in an open state the rotatable lock 56 has a lock latch 60 that does not engage a lock recess 62 or other lock keep in the housing 68 recess 44 to secure the cover 46 (e.g., panel) to prevent access to the handle 26.

As illustrated in FIG. 8B in one embodiment, the rotor 17 of the latch 15 can rotate with respect to frame 82 (e.g., hollow frame 82); the rotor 17 is secured to the frame 82 via a primary shaft 34 (e.g., stationary rotor shaft, hollow rotor shaft or tubular rotor shaft); the handle 26 comprises a lever that terminates in a grip 86 or key 40 at an outer end 90. The pawl 19 or hub (e.g. with projection or lobe) is rotatable with respect to the frame 82 at an interface end 88 via a secondary shaft 36 (e.g., stationary handle shaft, hollow or tubular handle shaft). As illustrated the frame 82 may have a frame slot 58 for accepting the keeper 16, where the frame slot 58 is coextensive with corresponding rotor slot 59 in the rotor 17.

In an alternate embodiment, the handle may comprise a rotatable knob or another device with a radial dimension selected to provide leverage for the torsional force applied to lock or release the latch 15 or by rotation of rotor 17.

The alternate latch 115 of FIG. 8C is similar to the latch 15 of FIG. 8A and FIG. 8B, except that the latch 115 replaces rotor 17 and pawl 19 with rotor 117 and pawl 119, respectively. Like reference numbers in FIG. 8A through FIG. 8C indicate like elements or like features. The latch 115 may replace the latch 15 in other embodiments set forth in this document.

In the alternate embodiment illustrated in FIG. 8C, the rotor 117 has rotor teeth 92 and the pawl 19 (e.g., hub with projection or lobe) of the handle 26 has interface teeth 94 that engage the rotor teeth 92 to rotate the rotor 117 (of latch 115) to an open state or its closed state. For example, the user can move or rotate the handle 26 or its grip 86 to rotate the rotor (17, 117), of latch (15, 115), to a closed state when the handle 26 or its grip 86 is moved or pushed (leftward in FIG. 8B or in FIG. 8C.) The latch (15, 115) is biased in the closed state by a resilient member such as a spring (30, 32), where to rotate the rotor 117 (of latch 115) to an open state the handle 26 or its grip 86 is moved or pulled (e.g., rightward in FIG. 8B or in FIG. 8C) with a force to overcome or oppose the biasing of the resilient member or spring (30, 32).

Mounting Bracket

The mounting bracket 12 comprises an engaging member 18 and a keeper 16. As shown, the engaging member 18 is generally parallel to the keeper 16, although in an alternative embodiment the engaging member 18 or the keeper 16 may be curved; hence, the engaging member 18 and the keeper 16 may exist in a non-parallel configuration. The engaging member 18 and keeper 16 are generally cylindrical or each has an interface or portion with a generally cylindrical cross section. The engaging member 18 and the keeper 16 may be connected by a first side 21 that is generally perpendicular to the engaging member 18 and the keeper 16. Likewise, the engaging member 18 and the keeper 16 may be connected by a second side 23 that is generally perpendicular to the engaging member 18 and the keeper 16. As shown, the first side 21 and the second side 23 are generally parallel to each other, although in an alternative embodiment the first side 21 and the second side 23 may be curved; hence, the first side 21 and the second side 23 may exist in a non-parallel configuration.

In one embodiment, a flange 25 is included in at least part of the spatial area bounded by the engaging member 18, keeper 16, first side 21, and second side 23. In one embodiment, the flange 25 includes mounting holes 20 for attaching the mounting bracket 12 to the vehicle. The mounting bracket 12 may be composed of plastic, metal, alloy, polymer, composite material, fiber-reinforced plastic, fiber-reinforced polymer or any other suitable material.

In one embodiment, mounting bracket 12 is symmetrical such that the engaging member 18 and the keeper 16 have substantially similar cross-sectional dimensions or configurations.

Retainer

In one embodiment, the retainer 14 is an integral part of the structure of the removable electronic device 22. In this embodiment, the retainer 14 comprises a molded tab extending from the removable electronic device 22, and a recess is formed between the retainer 14 and a surface (e.g. outer surface) of the removable electronic device 22. Installation of the removable electronic device 22 on the vehicle may involve inserting the retainer 14 under or partially around the engaging member 18. The combination of the retainer 14 and the engaging member 18 forms a hinge or rotational axis in which the retainer 14 at least partially encircles the engaging member 18. The engaging member 18 forms a rotational axis about which the retainer 14 and the removable electronic device 22 can rotate. Rotation of the retainer 14 about the engaging member 18 allows the latch 15 to engage the keeper 16.

In another embodiment, the retainer 14 comprises a bracket that is separate from the removable electronic device 22. The bracket is secured to the removable electronic device 22 by fasteners, adhesives, connectors, or otherwise. Use of a separate bracket allows an existing removable electronic device 22 to be adapted to use the mounting system 11. As in the embodiment in which the retainer 14 is an integral part of the structure of the removable electronic device 22, a recess is formed between the retainer 14 and a surface of the removable electronic device 22. Installation of the removable electronic device 22 on the vehicle may involve inserting the retainer 14 under or partially around the engaging member 18. The combination of the retainer 14 and the engaging member 18 forms a hinge or rotational axis in which the retainer 14 at least partially encircles the engaging member 18. The engaging member 18 forms a rotational axis about which the retainer 14 and the removable electronic device 22 can rotate. Rotation of the retainer 14 about the engaging member 18 allows the latch 15 to engage the keeper 16.

In one embodiment, the retainer 14 may comprise an uninterrupted tab whose length is approximately equal to the length of the engaging member 18. Further, the retainer 14 is of sufficient length to prevent lateral torsional movement of the removable electronic device 22 once the retainer 14 has engaged the engaging member 18 and the latch 15 has engaged the keeper 16.

In another embodiment, retainer 14 has a length that is less than the length of the engaging member 18. In this embodiment, the length of the retainer 14 is sufficient to prevent lateral torsional movement of the removable electronic device 22 once the retainer 14 has engaged the engaging member 18 and the latch 15 has engaged the keeper 16. For example, a retainer 14 whose length is at least half of the length of the engaging member 18 is sufficient to prevent lateral torsional movement of the removable electronic device 22.

Latch

As illustrated in FIG. 8B in one embodiment, the latch 15 (e.g., rotary latch) comprises a rotor 17, rotor spring 32, pawl 19, pawl spring 30, and handle 26 (e.g., lever). The rotor 17 and rotor spring 32 are pivotally mounted to the removable electronic device 22 about a primary shaft 34 (e.g., hollow stationary shaft) associated with the removable electronic device 22. The pawl 19 and pawl spring 30 are similarly pivotally mounted to the removable electronic device 22 about a secondary shaft 36 (e.g., hollow stationary shaft) associated with the removable electronic device 22. The rotor 17 is spring loaded by rotor spring 32 toward an open position. When the rotor 17 engages the keeper 16, the rotor 17 rotates to partially encircle the keeper 16. The pawl 19 also engages the rotor 17, holding the rotor 17 in a closed position. The pawl 19 is spring loaded by pawl spring 30 toward a direction that presses the pawl 19 against a notch 55 in the rotor 17, holding the rotor 17 in the closed position. A handle 26 is attached to the pawl 19. To release the pawl 19, the biasing force of the pawl spring 30 and the rotor spring 32 must be overcome by application of force by a user.

In another embodiment, a manual latch is used. As shown, a single latch 15 engages the keeper 16, securing the removable electronic device 22 to the mounting bracket 12. Alternatively, two or more latches 15 may be used (e.g., simultaneously and in parallel), with each latch 15 engaging the keeper 16. Use of two or more latches 15 provides additional stability for the removable electronic device 22, and provides redundancy to ensure that the removable electronic device 22 remains securely attached to the mounting bracket 12.

To allow removal of the removable electronic device 22, the handle 26 must be accessible to an operator. In one embodiment, the handle 26 is situated inside an indentation or recess 44. In addition to providing access to the handle 26, the indentation or recess 44 supports the storage, stowage or movement of a handle 26 in the recess 44 and within the storage volume 74 or pocket, along with a gap for placement of the operator's finger or hand.

Assembly

To attach the removable electronic device 22 to the vehicle, the mounting bracket 12 is attached to the vehicle. The mounting bracket 12 is attached to the vehicle using screws, rivets, bolts, adhesive, or other attachment means. Once the mounting bracket 12 is attached to the vehicle, the removable electronic device 22 can be installed on the vehicle and removed repeatedly without removing or reinstalling the mounting bracket 12.

During assembly, the latch 15 is in a first position (e.g. an open state). The retainer 14 is inserted into the engaging member 18, forming a hinge or rotational axis about which the retainer 14 and the removable electronic device 22 can rotate. The removable electronic device 22 is rotated about the engaging member 18. As the removable electronic device 22 is rotated about the engaging member 18, the rotor 17 of the latch 15 approaches the keeper 16. When the latch 15 engages the keeper 16, the latch 15 rotates into a second position (e.g. a closed or locked state) and closes around the keeper 16. The lever 26 (e.g., release lever) holds the pawl 19 in a position such that the rotor 17 is held in the closed position encircling the keeper 16. The pawl 19 is held in such position and the removable electronic device 22 thus remains securely fastened to the vehicle as long as the lever 26 is not triggered. Once the latch 15 has engaged the keeper 16, pressure is exerted on the removable electronic device 22, and prevents vibration or other movement of the removable electronic device 22. When the latch 15 is in the closed or locked state, the removable electronic device 22 is securely attached to the vehicle. Rotation of the retainer 14 and the removable electronic device 22 about the engaging member 18 is prevented.

The cover 46 may be placed over the recess 44 to cover and protect the lever 26 from being triggered or released by any unauthorized party (e.g., an interloper or thief) who is not authorized to remove the removable electronic device from the mounting bracket 12 or the vehicle to which the mounting bracket 12 is attached. For example, snap-fit arms 64 with snap-fit protrusions 70 engage corresponding snap-fit recesses 66 at a first end 52 of the cover 46. Meanwhile, at a second end 54 of the cover 46, which is opposite the first end, a rotatable lock 56 extends through an opening 50 in the cover 46 and can lock the cover 46 to the remainder of the housing, where the lock 56 is lockable by a lock latch 60 that rotates to engage or disengage a corresponding lock recess 62 or other lock keep in the housing of the electronic device 22. The user can insert a key 40 to rotate the rotatable lock 56 to engage or disengage the respective lock latch 60 in the lock recess 62 or other lock keep to lock or unlock the cover 46; hence, prevent or provide access of a user to the lever (e.g., connect) to assemble or disassemble (e.g., disconnect), the removable electronic device 22 from the mounting bracket 12 on the vehicle.

During disassembly, the lever 26 is triggered by a user. Triggering of the lever 26 allows the pawl 19 to rotate, thus allowing the rotor 17 to rotate into the open position and allowing the removable electronic device 22 to be removed from the mounting bracket 12 by removing the retainer 14 from the engaging member 18.

Accordingly, the mounting system 12 facilitates securely, but removably, attaching a removable electronic device 22 to a vehicle using simple, one-handed installation and removal of the device 22 without the use of tools or small hardware pieces. The mounting system 11 requires no magnet (for mounting) which could interfere with sensitive electronic equipment and which would require a ferrous structure on the vehicle. The mounting system 11 may be used advantageously in conjunction with metal alloy, plastic, polymeric or composite body panels or portions of a vehicle. A removable electronic device 22 installed using the mounting system 11 may be removed from the vehicle with one hand and without the use of tools or separate hardware. Once the mounting bracket 12 is installed, the mounting system 11 enables consistent placement of the removable electronic device 22 each time the removable electronic device 22 is installed on the vehicle, which enables consistent location information to be provided to precision farming software for every installation when the removable electronic device 22 is a location-determining receiver.

In another embodiment, an alternate retainer comprises two or more discrete hinge members rather than one continuous tab, where the alternate retainer replaces retainer 14. The discrete hinge members comprise tabs that are separated by sufficient space to prevent lateral torsional movement of the removable electronic device 22 once the alternate retainer has engaged the engaging member 18 and the latch 15 has engaged the keeper 16. For example, placing the discrete hinge members such that the length defined by the outer ends of the hinge members is approximately equal to or greater than approximately one-half of the length of the engaging member is sufficient to prevent lateral torsional movement of the removable electronic device 22.

In an alternate configuration, an alternate keeper and alternate engaging member may each comprise one or more alternate interface members (e.g., radial bushings) that are generally cylindrical and are associated (e.g., secured or rotationally connected) with the alternate keeper and the engaging member, where the alternate keeper replaces keeper 16 and where the alternate engaging member replaces engaging member 18.

Having described one or more preferred embodiments, it will become apparent that various modifications can be made without departing from the scope of the invention as defined in the accompanying claims.

The following is claimed:

1. A mounting system for mounting a removable electronic device with a housing on a vehicle, the mounting system comprising:
    a mounting bracket attachable to a vehicle, said mounting bracket having an engaging member and a keeper;
    a retainer attached to, or integral with, the removable electronic device, said retainer capable of engaging and rotating around said engaging member;
    a latch connected to said removable electronic device, said latch comprising a rotor capable of engaging said keeper and securing said removable electronic device to said mounting bracket after said retainer has engaged said engaging member;
    a handle for controlling the latch to engage or disengage the keeper, the handle in a a storage volume of the removable electronic device;
    a panel comprising a cover for covering the handle in the storage volume, the cover having one or more retainers associated with a first end of the cover; an opening in the panel being associated with a second end opposite the first end, wherein the one or more retainers comprise snap-fit arms that extend from the first end of the cover and that engage corresponding snap-fit recesses in the housing of the removable electronic device;
    a rotatable lock in the opening, where in a locked state the rotatable lock has a lock latch that engages a lock recess in the housing or lock keep in the housing to secure said second end of the cover to the housing to prevent or discourage access to the handle in the storage volume and where in an open state the lock latch does not engage the lock recess and wherein the cover is removable in the open state.

2. The mounting system according to claim 1 wherein each of the snap-fit arms terminate in a snap-fit protrusion.

3. The mounting system according to claim 1 wherein in the locked state the rotatable lock binds or locks the snap-fit protrusion in a static or fixed position with respect to its corresponding snap-fit recess.

4. The mounting system according to claim 1 wherein the rotatable lock simultaneously secures the first end and the second end to the housing to prevent movement between the housing and the cover.

5. The mounting system according to claim 1 wherein the cover has a storage volume that comprises a pocket for storing the handle.

6. The mounting system according to claim 5 wherein the storage volume has a generally polygonal cross section that tapers downward and inward toward a bottom of the storage volume.

7. The mounting system according to claim 6 wherein downward tapering walls of the storage volume are substantially curved or arced.

8. The mounting system according to claim 1 wherein in an open state the rotatable lock has a lock latch that does not engage the lock recess or the lock keep in the housing to secure the panel to prevent access to the handle.

9. The mounting system according to claim 1 wherein the rotor can rotate with respect to a frame, the rotor secured to the frame via a stationary rotor shaft, the handle comprising a lever that terminates in a grip or key at one end and that is rotatable with respect to the frame at an interface end via stationary handle shaft.

10. The mounting system according to claim 1 wherein the rotor has rotor teeth and the interface end of the handle has interface teeth that engage the rotor teeth to rotate the rotor of the latch to an open state when the handle or its grip is pulled and to rotate the rotor latch to a closed state when the handle or its grip is pushed.

11. The mounting system according to claim 2 wherein the latch is biased in the closed state by a resilient member such as a spring, wherein to rotate the rotor of the latch to an open state the handle or its grip is pulled with a force to overcome or oppose the biasing of the resilient member.

* * * * *